US012240947B2

(12) United States Patent
Huang et al.

(10) Patent No.: US 12,240,947 B2
(45) Date of Patent: Mar. 4, 2025

(54) FLAME-RETARDANT SEMI-AROMATIC POLYAMIDE AND PREPARATION METHOD THEREOF

(71) Applicant: KINGFA SCI. & TECH. CO., LTD., Guangdong (CN)

(72) Inventors: Xianbo Huang, Guangdong (CN); Huan Chang, Guangdong (CN); Nanbiao Ye, Guangdong (CN); Min Cao, Guangdong (CN); Chuanhui Zhang, Guangdong (CN); Kun Yan, Guangdong (CN); Zhongquan Peng, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 707 days.

(21) Appl. No.: 17/609,410

(22) PCT Filed: Apr. 10, 2020

(86) PCT No.: PCT/CN2020/084265
§ 371 (c)(1),
(2) Date: Nov. 8, 2021

(87) PCT Pub. No.: WO2020/224378
PCT Pub. Date: Nov. 12, 2020

(65) Prior Publication Data
US 2022/0227935 A1   Jul. 21, 2022

(30) Foreign Application Priority Data

May 9, 2019   (CN) .................. 201910383949.7

(51) Int. Cl.
C08G 69/42   (2006.01)
C08G 79/04   (2006.01)
C08G 63/692  (2006.01)

(52) U.S. Cl.
CPC ............. *C08G 69/42* (2013.01); *C08G 79/04* (2013.01); *C08G 63/692* (2013.01)

(58) Field of Classification Search
CPC ....... C08G 69/42; C08G 79/04; C08G 63/692
See application file for complete search history.

(56) References Cited

U.S. PATENT DOCUMENTS 4,127,590 A    11/1978   Endo et al.

FOREIGN PATENT DOCUMENTS

| CN | 103819666 |   | 5/2014  |              |
|----|-----------|---|---------|--------------|
| CN | 104231262 | A * | 12/2014 |              |
| CN | 105153416 |   | 12/2015 |              |
| CN | 105585710 |   | 5/2016  |              |
| CN | 104211954 |   | 10/2016 |              |
| CN | 106496548 | A * | 3/2017  | ............. C08G 69/04 |
| CN | 106589353 |   | 4/2017  |              |
| CN | 107501545 |   | 12/2017 |              |
| CN | 108588888 |   | 9/2018  |              |
| CN | 110204708 |   | 9/2019  |              |
| CN | 110218311 |   | 9/2019  |              |
| CN | 107936245 |   | 12/2020 |              |
| EP | 3476853   | A1 * | 5/2019  | ........ C07F 9/657172 |
| JP | H10131056 |   | 5/1998  |              |

OTHER PUBLICATIONS

"International Search Report (Form PCT/ISA/210) of PCT/CN2020/084265," mailed on Jul. 20, 2020, with English translation thereof, pp. 1-6.

* cited by examiner

*Primary Examiner* — Gregory Listvoyb
(74) *Attorney, Agent, or Firm* — JCIPRNET

(57) ABSTRACT

The invention discloses a flame-retardant semi-aromatic polyamide derived from the following monomers: a diacid monomer A: where A1 is terephthalic acid or terephthalic acid and other diacid, terephthalic acid accounts for 50 to 100 mol % of A1, and A2 is [(6-oxido-6H-dibenzo-(c,e)(1,2)-oxaphosphorin-6-ketone)-methyl]-butanedioic acid, A1+A2=100 mol %, A1=90 to 99 mol %, A2=1 to 10 mol %; and diamine monomer B: one or more of diamine monomers containing 4 to 36 carbon atoms. In the present invention, by an in situ polymerization, a specific flame-retardant monomer [(6-oxido-6H-dibenzo-(c,e)(1,2)-oxaphosphorin-6-ketone)-methyl]-butanedioic acid is copolymerized in a semi-aromatic polyamide chain segment, excellent mechanical properties and low water absorption can be obtained.

8 Claims, No Drawings

FLAME-RETARDANT SEMI-AROMATIC POLYAMIDE AND PREPARATION METHOD THEREOF

CROSS-REFERENCE TO RELATED APPLICATION

This application is a 371 of international application of PCT application serial no. PCT/CN2020/084265, filed on Apr. 10, 2020, which claims the priority benefit of China application no. 201910383949.7, filed on May 9, 2019. The entirety of each of the above mentioned patent applications is hereby incorporated by reference herein and made a part of this specification.

TECHNICAL FIELD

The present invention relates to the technical field of novel polymer materials, and particularly relates to a flame-retardant semi-aromatic polyamide and a preparation method thereof.

DESCRIPTION OF RELATED ART

Polyamide is the most widely used engineering plastic, which has important applications in fields of electronic appliances, home appliances, etc. However, flammability and water absorption of polyamide itself fluctuate greatly, which greatly limits the application and promotion of the polyamide. Therefore, for the polyamide a flame-retardant modification and at the same time reduction of the water absorption has a very important significance.

Flame-retardant modification methods of the polyamide mainly include copolymerization flame-retardant modification, blending flame-retardant modification and post-treatment flame-retardant modification. At present, the method of blending flame-retardant modification is widely used. However, because a flame retardant is usually a small molecule, it is prone to have a micro phase separation in a blending system with the polyamide, which damages a mechanical property and flame-retardant property of the material, and limits the application of the flame-retardant polyamide especially in the fields of precision components, such as electronic appliances. The method of post-treatment flame-retardant modification is only limited to polyamide fiber, and the application field is very limited. The method of in situ copolymerization flame-retardant modification means that a reactive flame retardant is connected to a polyamide chain through a chemical bond, achieving a molecular-level modification, where there is no migration, agglomeration and precipitation of the flame retardant, and it has an intrinsic flame-retardant characteristic.

The following four Chinese patents disclose a method of in situ copolymerization flame-retardant modification of the polyamide by a reactive flame retardant.

Chinese patent 2013102079850 discloses a halogen-free flame-retardant nylon 66 polymer, wherein in this method, a reactive flame retardant DOPO derivative is copolymerized with a diacid or a diamine to form a salt, and then the resulting salt is copolymerized with a nylon 66 salt, to obtain the halogen-free flame-retardant nylon 66 polymer. Chinese patent 2015106245312 discloses a bi-phosphorous flame-retardant copolymerized nylon, wherein an intermediate, a bi-phosphorous organophosphoryl ammonium salt, which is synthesized by a diamine of phosphine oxides and a dihydric alcohol of phosphine oxides, is adopted to copolymerize with a nylon 66 salt to prepare the bi-phosphorous flame-retardant copolymerized nylon. However, the technology of the above-mentioned patents is limited to the synthesis of in situ copolymerized flame-retardant material of nylon 66, where there is no development of any in situ copolymerized flame-retardant material suitably used in a semi-aromatic polyamide system and the corresponding high-temperature resistant polymerization method. Moreover, the above-mentioned in situ copolymerized flame-retardant nylon 66 has much lower mechanical properties than ordinary nylon 66, which cannot meet the demand for a high-strength flame-retardant product.

Chinese patent 2015106604531 discloses a flame-retardant high-temperature resistant nylon copolymer, wherein a nylon salt obtained by a reaction with a reactive flame retardant bis(p-carboxyphenyl)phenyl phosphine oxide is used to copolymerize with an ordinary nylon salt, to obtain a flame-retardant polyamide product. Chinese patent 2017112299959 discloses a permanent halogen-free flame-retardant PA10T polyamide resin, wherein by salt formation, pre-polymerization, and solid phase polymerization, 1,1,3,5-tetraphenylamine cyclotriphosphazene is copolymerized to polyamide. Although in these two patents, a flame-retardant semi-aromatic polyamide material has been developed, a mechanical property and a water absorption resistance of the developed flame-retardant material are significantly reduced compared with those before copolymerization, which limits the application of this type of material in the industries of electronic appliances.

From the perspective of the preparation method, the above process requires that a reactive flame-retardant monomer is first synthesized into a flame-retardant precursor to improve stability of the reactive flame-retardant monomer during the polymerization process. However, an additional pretreatment step will lead to an increase in process cost and reduce market competitiveness of the product.

SUMMARY

An objective of the present invention is to provide a flame-retardant semi-aromatic polyamide, which has advantages of an excellent flame-retardant property, a good mechanical property and low water absorption.

Another objective of the present invention is to provide a preparation method of the above flame-retardant semi-aromatic polyamide, which has simple process steps and low production cost.

The present invention is realized through the following technical solutions.

A flame-retardant semi-aromatic polyamide, derived from the following monomers:
  a diacid monomer A: where A1 is terephthalic acid or terephthalic acid and other diacid, terephthalic acid accounts for 50 to 100 mol % of A1, and A2 is [(6-oxido-6H-dibenzo-(c,e)(1,2)-oxaphosphorin-6-ketone)-methyl]-butanedioic acid, A1+A2=100 mol %, A1=90 to 99 mol %, A2=1 to 10 mol %; and
  a diamine monomer B: one or more of diamine monomers containing 4 to 36 carbon atoms.

A structural formula of [(6-oxido-6H-dibenzo-(c,e)(1,2)-oxaphosphorin-6-ketone)-methyl]-butanedioic acid (DDP) is as follows:

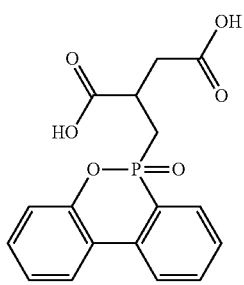 [SMILES: O=C(O)CC(CP1(=O)Oc2ccccc2-c2ccccc21)C(=O)O]

DDP is a kind of a flame-retardant monomer, which dicarboxylic acid with a phosphate ester structure can be polymerized with a diamine monomer. The in situ copolymerized flame-retardant semi-aromatic polyamide has a good flame-retardant effect and a good mechanical property. Moreover, the present invention has found that, contrary to an expected effect, compared to other flame-retardant monomers (even for a flame-retardant monomer with a phosphate ester structure similar to DDP, a water absorption property after addition is not very satisfactory), the in situ copolymerized flame-retardant semi-aromatic polyamide containing a phosphate ester structure DDP has a reduced water absorption.

Preferably, in the diacid monomer A, a content of A2 is 2.5 to 7.7 mol % of all the diacid monomers.

At a preferred A2 content, mechanical properties can be further improved and water absorption can be reduced.

The other diacid monomer is selected from at least one of an aliphatic diacid and an aromatic diacid.

The aliphatic diacid is selected from one or more of oxalic acid, malonic acid, 1,4-succinic acid, 1,5-glutaric acid, 1,6-adipic acid, 1,7-pimelic acid, 1,8-suberic acid, 2-methyl suberic acid, 1,9-azelaic acid, 1,10-sebacic acid, 1,11-undecanedioic acid, 1,12-dodecanedioic acid, 1,13-tridecanedioic acid, 1,14-tetradecanedioic acid, and cyclohexanedicarboxylic acid; the aromatic diacid is selected from at least one of isophthalic acid and naphthalenedicarboxylic acid.

The diamine monomer B is selected from one or more of 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,14-tetradecanediamine, 1,16-hexadecandiamine, 1,18-octadecanediamine, 1-butyl-1,2-ethylenediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, and 5-methyl-1,9-nonanediamine; and preferably selected from at least one of 1,10-decanediamine and 1,6-hexanediamine.

Preferably, the other diacid is selected from at least one of isophthalic acid and 1,6-adipic acid.

A preparation method of the above flame-retardant semi-aromatic polyamide includes the following steps: weighing the diacid monomer A, the diamine monomer B, a catalyst (which may be sodium hypophosphite), and deionized water into a high-temperature high-pressure reactor, after gas aerating and exchange to make atmosphere in the reactor as nitrogen, heating up to 160 to 180° C., reacting at a constant temperature for 0.5 hours, continuing to heat up to 200 to 210° C., and reacting at a constant temperature for 0.5 hours, continuing to heat up to 240 to 250° C., reacting at a constant temperature for 1 hour, draining for about 0.5 hours, discharging, and granulating; putting the granulated material into a rotating drum, evacuating to make a pressure lower than 3000 Pa, heating up to 230 to 260° C., reacting for 3 hours, stopping heating, and after the temperature returning to room temperature, discharging the material to obtain the flame-retardant semi-aromatic polyamide.

Compared with the prior art, the present invention has the following beneficial effects.

For the flame-retardant semi-aromatic polyamide of the present invention, by an in situ copolymerization with a specific flame-retardant monomer DDP in a chain segment, the semi-aromatic polyamide has a good flame-retardant property and at the same time has a good mechanical property and low water absorption. By adjusting a molar ratio of DDP in the diacid monomer A, a proportion of an aromatic ring in a main chain structure of the semi-aromatic polyamide is optimized, and the water absorption is further reduced.

Different from the prior art, the preparation method of the present invention can ensure a smooth progress of the polymerization reaction, without pretreatment of the reactive flame-retardant monomer DDP, where a gradient heating process can improve stability of the reactive flame-retardant monomer during the polymerization process, and an in situ copolymerized flame-retardant semi-aromatic polyamide having an intrinsic flame-retardant property, an excellent mechanical property and low water absorption is obtained.

DESCRIPTION OF THE EMBODIMENTS

The present invention is further illustrated by the following embodiments, but which shall not be understood as limitation of the protection scope of the present invention.

Raw materials used in the present invention are derived from commercially available products.

BCPPO: bis(4-carboxyphenyl)phenyl phosphine oxide;
CEPPA: 3-hydroxyphenylphosphinyl propanoic acid
CEMPO: bis(2-carboxyethyl)methyl phosphine oxide; and
MCA: cyanuric acid.

A preparation method of a polyamide in Embodiments and Comparative Examples: according to a ratio of each component in Tables 1 to 4, weighing a diacid monomer A, a diamine monomer B, sodium hypophosphite, and deionized water into a high-temperature high-pressure reactor, after gas aerating and exchange to make atmosphere in the reactor as nitrogen, heating up to 160 to 180° C., reacting at a constant temperature for 0.5 hours, continuing to heat up to 200 to 210° C., and reacting at a constant temperature for 0.5 hours, continuing to heat up to 240 to 250° C., reacting at a constant temperature for 1 hour, draining for about 0.5 hours, discharging, and granulating, putting the granulated material into a rotating drum, evacuating to make a pressure lower than 3000 Pa, heating up to 230 to 260° C., reacting for 3 hours, stopping heating, and after the temperature returning to room temperature, discharging the material to obtain the semi-aromatic polyamide.

Test Methods of Various Properties (1) End groups: a potentiometric titrator was used to determine an amino end group content and a carboxyl end group content of the polymer. A sample of 0.45 g polyamide was weighed, 50 mL of preheated and dissolved o-cresol was added and heated to reflux until the sample was dissolved. After cooling to 50° C. in a water tank at 50° C., 0.5 mL of formaldehyde solution was added, a magnetic stirrer was put in to stir the solution, an electrode test section of the automatic potentiometric titrator was immersed into the solution, and carboxyl end group data were measured by titration with a calibrated KOH-ethanol solution. 0.45 g of the sample was weighed, 45 mL of phenol and 3 mL of anhydrous methanol were added, heated to reflux until the sample was dissolved. After cooling to 50° C. in the water tank at 50° C., the magnetic stirrer was put in to stir the solution, the electrode test section of the automatic potentiometric titrator was immersed into the solution, and amino end group data were measured by titration with a calibrated hydrochloric acid solution.

(2) Relative viscosity: with reference to a standard GB/T 12006.1-1989, a Ubbelohde viscometer was used to measure a relative viscosity of a product with a concentration of 0.25 g/dL in 98% concentrated sulfuric acid at (25±0.01°) C.

In the present invention, a molecular weight of the polyamide is determined according to an end group content and a relative viscosity of the polyamide. Under the premise of the same monomer, if the relative viscosity and the end group content are similar, the molecular weight of the polyimide is similar.

(3) Tensile strength: with reference to ISO 527, tensile strength of a resin material was tested.

(4) Bending strength: with reference to a standard ISO 178, bending strength of a resin material was tested.

(5) Notched impact strength/unnotched impact strength: with reference to a standard ISO 180, impact strength of a resin material was tested.

(6) UL94 flame-retardant rating: measured with reference to GB/T2408-1996, with a test sample size of 13 cm×1.3 cm×0.3 cm.

(7) Limiting oxygen index (LOI): measured with reference to a standard GB/T5454-1997, with a test sample size of 12 cm×1 cm×0.4 cm.

(8) Water absorption: with reference to a standard ISO 62:2008, water absorption of a resin material was tested.

TABLE 1

Ratio of each component of the polyamide and test results in Embodiments 1 to 4

|  | Embodiment 1 10T10DDP | Embodiment 2 10T10DDP | Embodiment 3 10T10DDP | Embodiment 4 10T10DDP |
|---|---|---|---|---|
| mol % of DDP accounting for a diacid monomer | 1 | 2.5 | 5 | 7.7 |
| mol % of terephthalic acid and/or other diacid monomer | 99 | 97.5 | 95 | 92.3 |
| Amino end group mol/t | 72 | 74 | 77 | 75 |
| Carboxyl end group mol/t | 108 | 138 | 133 | 136 |
| Relative viscosity | 1.88 | 1.87 | 1.87 | 1.87 |
| Tensile strength MPa | 73.2 | 76.0 | 75.2 | 76.8 |
| Bending strength MPa | 92.5 | 95.3 | 94.2 | 95.7 |
| Notched impact strength kJ/m$^2$ | 5 | 6 | 6 | 6 |
| Unnotched impact strength kJ/m$^2$ | 35 | 39 | 39 | 38 |
| UL flame-retardant rating | V0 | V0 | V0 | V0 |
| LOI | 32 | 35 | 35 | 35 |
| Water absorption % | 0.6 | 0.3 | 0.3 | 0.3 |

TABLE 2

Ratio of each component of the polyamide and test results in Embodiments 5 to 8

|  | Embodiment 5 10T10DDP | Embodiment 6 6T/66/6DDP | Embodiment 7 6T/66/6DDP | Embodiment 8 6T/6I/6DDP |
|---|---|---|---|---|
| mol % of DDP accounting for a diacid monomer | 10 | 1 | 10 | 1 |
| mol % of terephthalic acid and/or other diacid monomer | 90 | 99 (T:6 = 50:50) | 90 (T:6 = 50:50) | 99 (T:I = 80:20) |
| Amino end group mol/t | 71 | 76 | 89 | 70 |
| Carboxyl end group mol/t | 130 | 132 | 140 | 110 |
| Relative viscosity | 1.86 | 1.87 | 1.85 | 1.88 |
| Tensile strength MPa | 74.3 | 73.1 | 72.2 | 76.3 |
| Bending strength MPa | 92.7 | 95.9 | 93.8 | 96.8 |
| Notched impact strength kJ/m$^2$ | 5 | 5 | 6 | 5 |
| Unnotched impact strength kJ/m$^2$ | 35 | 38 | 40 | 36 |
| UL flame-retardant rating | V0 | V0 | V0 | V0 |
| LOI | 34 | 31 | 34 | 32 |
| Water absorption % | 0.6 | 0.7 | 0.7 | 0.6 |

TABLE 3

Ratio of each component of the polyamide and test results in Embodiments 9 to 11

|  | Embodiment 9 6T/6I/6DDP | Embodiment 10 10T/66/10DDP | Embodiment 11 10T10I10DDP |
|---|---|---|---|
| mol % of DDP accounting for a diacid monomer | 10 | 5 | 5 |
| mol % of terephthalic acid and/or other diacid monomer | 90 (T:I = 80:20) | 95 (T:6 = 80:20) | 95 (T:I = 80:20) |
| Amino end group mol/t | 85 | 88 | 81 |
| Carboxyl end group mol/t | 135 | 137 | 136 |
| Relative viscosity | 1.86 | 1.85 | 1.86 |
| Tensile strength MPa | 74.6 | 75.0 | 75.0 |
| Bending strength MPa | 94.5 | 94.8 | 105 |
| Notched impact strength kJ/m$^2$ | 6 | 6 | 8 |
| Unnotched impact strength kJ/m$^2$ | 39 | 38 | 42 |
| UL flame-retardant rating | V0 | V0 | V0 |
| LOI | 35 | 35 | 35 |
| Water absorption % | 0.7 | 0.6 | 0.5 |

TABLE 4

Ratio of each component of the polyamide and test results in Comparative examples

|  | Comparative example 1 10T | Comparative example 2 10T10I | Comparative example 3 PA66 | Comparative example 4 PA66/6DDP |
|---|---|---|---|---|
| mol % of a flame-retardant monomer accounting for a diacid monomer | 0 | 0 | 0 | 5 |
| mol % of terephthalic acid and/or other diacid monomer | 100 | 100 (T:I = 80:20) | 100 | 95 |
| Amino end group mol/t | 68 | 71 | 69 | 72 |
| Carboxyl end group mol/t | 104 | 112 | 100 | 110 |
| Relative viscosity | 1.89 | 1.88 | 1.88 | 1.86 |
| Tensile strength MPa | 78.1 | 78.0 | 63.7 | 41 |
| Bending strength MPa | 97.9 | 96.1 | 80.5 | 58.5 |
| Notched impact strength kJ/m$^2$ | 5 | 5 | 5 | 4 |
| Unnotched impact strength kJ/m$^2$ | 37 | 35 | 35 | 30 |
| UL flame-retardant rating | — | — | — | V0 |
| LOI | 26 | 26 | 21 | 30 |
| Water absorption % | 1.2 | 1.2 | 3.0 | 3.5 |

|  | Comparative example 5 10T10BCPPO | Comparative example 6 10T10CEPPA | Comparative example 7 10T10I10DDP |
|---|---|---|---|
| mol % of a flame-retardant monomer accounting for a diacid monomer | 5 | 5 | 5 |
| mol % of terephthalic acid and/or other diacid monomer | 95 | 95 | 95 (T:I = 20:80) |
| Amino end group mol/t | 73 | 75 | 81 |
| Carboxyl end group mol/t | 121 | 119 | 136 |
| Relative viscosity | 1.89 | 1.89 | 1.86 |
| Tensile strength MPa | 74.6 | 72.9 | 63.0 |
| Bending strength MPa | 93.7 | 92.8 | 47.0 |
| Notched impact strength kJ/m$^2$ | 5 | 6 | 9 |
| Unnotched impact strength kJ/m$^2$ | 33 | 33 | 40 |
| UL flame-retardant rating | V0 | V0 | V0 |
| LOI | 32 | 32 | 30 |
| Water absorption % | 1.5 | 1.6 | 1.1 |

|  | Comparative example 8 10T10DDP | Comparative example 9 10T10MCA | Comparative example 10 10T10CEMPO |
|---|---|---|---|
| mol % of a flame-retardant monomer accounting for a diacid monomer | 30 | 5 | 5 |
| mol % of terephthalic acid and/or other diacid monomer | 70 | 95 | 95 |
| Amino end group mol/t | 90 | 78 | 75 |
| Carboxyl end group mol/t | 143 | 115 | 117 |
| Relative viscosity | 1.84 | 1.89 | 1.89 |
| Tensile strength MPa | 62.5 | 60.7 | 55.6 |
| Bending strength MPa | 83.3 | 78.2 | 65.4 |
| Notched impact strength kJ/m$^2$ | 6 | 4 | 4 |
| Unnotched impact strength kJ/m$^2$ | 45 | 29 | 27 |

TABLE 4-continued

Ratio of each component of the polyamide and test results in Comparative examples

| UL flame-retardant rating | V0 | V2 | V2 |
|---|---|---|---|
| LOI | 36 | 25 | 24 |
| Water absorption % | 1.3 | 1.5 | 1.9 |

It can be seen from Embodiments 1 to 5 that at a preferred DDP content range, a flame retardant effect and mechanical properties are good, and water absorption is low.

It can be seen from Comparative Example 1 and Table 1 that for an in situ polymerization of DDP into 10T, not only an excellent flame-retardant property is obtained, but also mechanical properties are maintained and even improved and water absorption is reduced.

It can be seen from Comparative Example 1 or 6 that when the in situ copolymerized flame-retardant monomer is CEPPA, although there are good mechanical properties and flame-retardant rating, water absorption is relatively high.

It can be seen from Comparative Example 1 or 5 that when the in situ copolymerized flame-retardant monomer is BCPPO, mechanical properties are decreased and water absorption is high.

It can be seen from Comparative Example 3 or 4 and Table 1 that after an in situ copolymerization of DDP in an aliphatic polyamide PA66 system, mechanical properties are significantly reduced; while after an in situ copolymerization of DDP in a semi-aromatic polyamide, relatively good mechanical properties are maintained, a flame-retardant property and a water absorption property are significantly improved.

It can be seen from Embodiment 11 and Comparative Example 7 that when a content of terephthalic acid accounting for the diacid monomer A is too low, it not only reduces a flame-retardant property to a certain extent and causes water absorption to rise, and leads to very poor mechanical properties, making it difficult to achieve application values.

It can be seen from Comparative Example 8 that when a content of DDP accounting for the diacid monomer A is too high, it also causes a decrease in mechanical properties and an increase in water absorption.

It can be seen from Comparative example 9 or 10 that when the in situ copolymerized flame-retardant monomer is MCA or CEMPO, a flame-retardant effect and mechanical properties are both relatively poor, and water absorption is relatively high.

What is claimed is:

1. A flame-retardant semi-aromatic polyamide, wherein the flame-retardant semi-aromatic polyamide is derived from the following monomers:
    a diacid monomer A including a diacid monomer A1 and a diacid monomer A2, wherein the diacid monomer A1 is terephthalic acid or terephthalic acid and other diacid, terephthalic acid accounts for 50 to 100 mol % of the diacid monomer A1, and the diacid monomer A2 is [(6-oxido-6H-dibenzo-(c,e) (1,2)-oxaphosphorin-6-ketone)-methyl]-butanedioic acid, a total content of the diacid monomer A1 and the diacid monomer A2 is 100 mol %, a content of the diacid monomer A1 is 90 to 99 mol %, and a content of the diacid monomer A2 is 1 to 10 mol %; and
    a diamine monomer B including one or more of diamine monomers containing 4 to 36 carbon atoms.

2. The flame-retardant semi-aromatic polyamide according to claim 1, wherein in the diacid monomer A, the content of the diacid monomer A2 is 2.5 to 7.7 mol %.

3. The flame-retardant semi-aromatic polyamide according to claim 1, wherein the other diacid is selected from at least one of an aliphatic diacid and an aromatic diacid.

4. The flame-retardant semi-aromatic polyamide according to claim 3, wherein the aliphatic diacid is selected from one or more of oxalic acid, malonic acid, 1,4-succinic acid, 1,5-glutaric acid, 1,6-adipic acid, 1,7-pimelic acid, 1,8-suberic acid, 2-methyl suberic acid, 1,9-azelaic acid, 1,10-sebacic acid, 1,11-undecanedioic acid, 1,12-dodecanedioic acid, 1,13-tridecanedioic c acid, 1,14-tetradecanedioic acid, and cyclohexanedicarboxylic acid.

5. The flame-retardant semi-aromatic polyamide according to claim 3, wherein the aromatic diacid is selected from at least one of isophthalic acid and naphthalenedicarboxylic acid.

6. The flame-retardant semi-aromatic polyamide according to claim 1, wherein the diamine monomer B is selected from one or more of 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,14-tetradecanediamine, 1,16-hexadecandiamine, 1,18-octadecanediamine, 1-butyl-1,2-ethylenediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, and 5-methyl-1,9-nonanediamine.

7. The flame-retardant semi-aromatic polyamide according to claim 6, wherein the diamine monomer B is selected from at least one of 1,10-decanediamine and 1,6-hexanediamine.

8. The flame-retardant semi-aromatic polyamide according to claim 3, wherein the other diacid is selected from at least one of isophthalic acid and 1,6-adipic acid.

* * * * *